(12) United States Patent
Hart et al.

(10) Patent No.: US 7,392,828 B2
(45) Date of Patent: Jul. 1, 2008

(54) INSERTION PART FOR INSERTING INTO A GAS OR LIQUID LINE

(75) Inventors: Keith Hart, Welland (GB); Michael Söchtig, Müllheim (DE); Christoph Weis, Müllheim (DE)

(73) Assignee: Neoperl GmbH, Mullheim (DE)

( * ) Notice: Subject to any disclaimer, the term of this patent is extended or adjusted under 35 U.S.C. 154(b) by 0 days.

(21) Appl. No.: 10/549,245

(22) PCT Filed: Dec. 17, 2003

(86) PCT No.: PCT/EP03/14388

§ 371 (c)(1),
(2), (4) Date: Sep. 12, 2005

(87) PCT Pub. No.: WO2004/083698

PCT Pub. Date: Sep. 30, 2004

(65) Prior Publication Data

US 2006/0086397 A1 Apr. 27, 2006

(30) Foreign Application Priority Data

Mar. 15, 2003 (DE) ................. 103 11 502

(51) Int. Cl.
*F16K 15/14* (2006.01)
(52) U.S. Cl. ............... 137/859; 137/512.15; 137/515
(58) Field of Classification Search ............ 137/515, 137/516.29, 512.15, 852, 859
See application file for complete search history.

(56) References Cited

U.S. PATENT DOCUMENTS

| 2,621,889 A | 12/1952 | Annin |
| 5,971,024 A * | 10/1999 | Penny ............... 137/859 |
| 6,089,260 A | 7/2000 | Jaworski et al. |

FOREIGN PATENT DOCUMENTS

| DE | 1 009 871 | 7/1955 |
| DE | 938 888 | 2/1956 |
| DE | 946 760 | 8/1956 |
| DE | 1 154 982 | 1/1957 |
| DE | 1 182 487 | 8/1957 |
| DE | 1 500 206 | 4/1965 |
| DE | 28 22 131 | 5/1978 |
| DE | G 83 34 283.4 | 11/1983 |
| DE | 37 06 737 | 9/1988 |
| FR | 1 389 947 | 2/1965 |
| FR | 2 426 199 | 12/1979 |
| GB | 875034 | 6/1958 |

\* cited by examiner

*Primary Examiner*—Ramesh Krishnamurthy
(74) *Attorney, Agent, or Firm*—Volpe And Koenig P.C.

(57) ABSTRACT

An insertion part is provided in the form of a back-flow preventer and which can be inserted in a gas or liquid line. An insertion part is also provided that can be inserted into a gas or liquid line in the form of a flow regulator. The insertion parts are characterizedin that they comprise an annular lip shaped part which, togther with its annular body, is held inside the housing and which has at least one controlling lip (9), with the controlling lip being displaced by the fluid, and/or at least one sealing lip (14). The insertion part can be used in a versatile manner and is characterized by the simple production thereof as well as by having a uniform and reliable functioning.

3 Claims, 4 Drawing Sheets

INSERTION PART FOR INSERTING INTO A GAS OR LIQUID LINE

BACKGROUND

The invention relates to an insertion part having a housing, which can be inserted into a gas or liquid line, with an annular lip shaped part being arranged in the interior of the housing, held to the interior of the housing with its annular body, which is provided in an area of a feeder channel and has at least one lip, that can be displaced by the fluid, and cooperates with an opposing housing wall.

A back-flow valve is known from DE 1 154 982, which is provided with a housing that can be inserted into a gas or liquid line, with a sealing body being movably arranged inside the housing, which seals the flow opening of a feeder channel in the closed position. The sealing body of the known back-flow valve is embodied as an essentially hose-shaped lip shaped part, extending in the annular direction, which is held inside the housing and contacts with its cylindrical housing part, surrounded by the sealing body, the lip end region in a sealing manner in the area of the flow opening of the feeder channel.

The sanitary insertion part known from DE 1 154 982 is embodied as a back-flow valve, with its sealing body being adjusted either to an open or a closed position. The insertion part known from 1 154 982 however is not embodied as a flow regulator, which can adjust the volume of the flow passing through the water line per time unit depending on a maximum value independent from the pressure.

From GB-PS 875 034 another mere back-flow valve is known, which encompasses in its housing a cylindrical interior housing space. In this interior housing space a piston-like valve unit is guided in a shiftable manner, which can be displaced under the pressure of the water flowing from the inlet to the opposite face of the interior housing space provided. This piston-like valve unit is provided with a lip shaped piece, which seals in its resting position the flow openings which penetrate the valve unit and which can be moved into an open position by water flowing in the flow direction. When an amount of water flows opposite the flow direction, the lip end region of the lip shaped piece is pressed against the wall edge region encompassing the flow openings and effectively counteracts the back-flow of the water. Here, too, the insertion part known from GB-PS 875 034 is neither intended nor suitable as a flow regulator.

From DE 1 182 487 a back-flow valve is known intended for high operational pressure, in which the annular channel between the valve housing and a centered insertion body, inserted therein in a streamline shape, is sealed by a sheath-shaped valve piece made from an elastic material. While the sealing piece is motioned by the water flowing in the usual flow direction, an amount of water reversing opposite the usual flow direction presses the sealing piece increasingly against the streamlined insertion body so that the annular channel remains sealed.

Comparable back-flow valves have also been known from FR 2 426 199, U.S. Pat. No. 2 621 889, DE 109 871, FR 1 389 947, DE 938 888, DE 946 760, DE 1 500 206 as well as from DE 37 06 737.

As already mentioned, none of these known back-flow valves are capable of adjusting the volume to a maximum value that can flow through the water line per time unit independent from the pressure.

Flow regulators have already been designed, which are provided with a tapering or cone-shaped housing core on the inside of their housing. The housing core is encompassed by an annular throttle body or control body made from an elastic material, which limits the control gap between itself and the housing core depending on the pressure. When producing the previously known flow regulators, the necessary throttle bodies and control bodies are subject to the elastic characteristics of the rubber material, which can lead to different control features of one insertion part to another. Furthermore, the known insertion parts are usually embodied in multiple parts and are thus expensive in their production.

SUMMARY

Therefore, the object is to provide a multi-use insertion part, which is characterized in a simple production and preferably also in a consistent and secure function.

The solution according to the invention comprises an insertion part of the type mentioned at the outset in particular in that the insertion part is embodied as a flow regulator, with its lip shaped part having at least one throttle body or one control body and being provided with a control lip, its free lip end that extends in a direction of the adjacent housing wall, which control lip limits the control gap and changes depending on pressure, between itself and the adjacent housing wall.

The insertion part according to the invention is embodied as a flow regulator. The insertion part, which can be inserted into a gas line or a liquid line as a flow regulator, is provided with a lip shaped part, which is held inside the housing. This lip shaped part has at least one control lip, embodied as a throttle body or a control body and aligned with its free lip end extending in the direction of the adjacent housing wall. This control lip can be displaced depending on the pressure of the fluid such that the control gap provided between the control lip and the adjacent housing wall is modified depending on the pressure. Due to the fact that the insertion part, which can easily be produced essentially in two parts, is also provided with a control lip and due to the fact that the reaction behavior of this control body is less dependent on the elastic features of the material composition used but rather from the shape and the dimensions of the control lip, the insertion part according to the invention is characterized in a constant control function.

Here, a particularly beneficial further development of the invention provides that the insertion part is simultaneously embodied as a back-flow preventer and that the annular lip shaped part of the insertion part has at least one sealing lip, which is provided as a sealing body, movably arranged inside the housing, and sealing in the closed position the flow opening of the feeder channel, with the sealing lip in the closed position contacting the opposing housing surface in a sealing fashion.

The insertion part, simultaneously embodied as a back-flow preventer, is provided with an annular lip shaped part which is held with its annular body inside the housing. This lip shaped part has at least one sealing lip that can be displaced by the fluid, and can be moved by a back-flow of the fluid in a direction of an opposite housing surface such that the sealing lip in its closed position contacts with its lip end region a housing surface in a sealing manner. When the housing is embodied in one part, the insertion part according to the invention can be embodied essentially in two parts, namely the housing and the lip shaped part. This small number of parts is beneficial for the high functional security of the insertion part according to the invention.

Here, a preferred embodiment of the invention includes for the inside of the housing to be provided with a housing core, which limits a flow opening between itself and the interior circumference of the housing, and the lip shaped part is held with its annular body at the interior circumference of the housing and contacts the housing core with its free lip end region of its sealing lip in a sealing manner in the closed position.

It is particularly advantageous for the lip shaped part to be held with its annular body at the interior circumference of the housing, in order to align the free lip end of the control lip in a direction toward the adjacent housing wall of a housing core.

A further development according to the invention, worth protecting in itself, combines the function of a flow regulator and a back-flow preventer in a single insertion part and provides for the lip shaped part to have at least one upstream control lip and/or control lip and at least one downstream sealing lip.

In order to achieve a sensitive reaction behavior, largely independent from the material of the flow regulator according to the invention, it is beneficial for the control lip to be aligned with its free lip end region extending in the direction opposite to the flow direction of the fluid and limiting an annular space open in the upstream direction between itself and the interior circumference of the housing. In this blind-hole shaped, upstream opening annular space, the inflowing fluid impinges the control lip such that the lip is pressed towards the housing core depending on pressure and thus changes the control gap limiting and leveling the amount flowing.

In order to allow the targeted amount of fluid to flow unhindered through the insertion part during low as well as high pressures, it is beneficial for the housing wall adjacent to the free lip end of the control lip to be provided with a control profiling, with the control profiling preferably being formed by grooves or moldings aligned in the direction of the flow. These moldings may also be provided at the housing core in the area of the control lip, for example. Due to the fact that the control lip is not pressed in a direction of the adjacent housing wall until a defined pressure value has been reached, the control lip reacts with a distinctly noticeable peak at this pressure value, which can be utilized as a control impulse for subsequent devices downstream.

Here, a sensitive reaction of the insertion part serving at least as a flow regulator is promoted if the molding, preferably evenly distributed over the circumference of the wall of the adjacent housing wall, is arc-shaped or similarly rounded.

In contrast thereto, the sealing lip of the insertion part serving at least as a back-flow preventer can be aligned in the radial direction and, in the closed position, cooperate with an annular flange at the housing core. However, an embodiment is preferred, in which the sealing lip is arranged with its free lip end region extending in the direction of the flow. In the event of an undesired back-flow, such a sealing lip, aligned in the flow direction, can also contact a cylindrical or cone-shaped and/or tapered housing core in a sealing manner.

Here, it is advantageous for the housing wall adjacent to the free lip end to have a wall section free from grooves or moldings in the area impinged by the sealing lip.

While the housing is preferably made from a suitable dimensionally stable metal or, in particular, plastic material, if necessary, one preferred embodiment of the invention provides for the lip shaped part to be made from an elastic rubber or plastic material.

Although the reaction pressure and the reaction behavior of the control and/or sealing lips can be solely influenced and determined by the shore-hardness of the rubber-elastic material, for example, an embodiment is preferred, though, in which the reaction pressure and the reaction behavior of the control lip and/or the sealing lip is predetermined by the length, the thickness, or a similar design and dimension of the lip(s) and/or by the material characteristics of the lip shaped part.

For example, the lip shaped part can be inserted and held in a groove, which is provided at the interior circumference of the housing made in one piece, if necessary. However, an embodiment is preferred, in which the housing of the insertion part is provided in at least two parts, and the annular lip shaped part is held with its annular body between two adjacent housing parts.

Here, it can be beneficial for the annular body of the lip shaped part to be embodied as a housing part seal for the adjacent housing parts.

In order to be able to perhaps optimize the functions of the insertion part according to the invention with regard to control flow and preventing back-flow, it can be advantageous for the control body of the lip shaped part at both sides to comprise at least one control and/or sealing lip, and for the control and/or sealing lip to be arranged in an area of an allocated flow opening and/or in the area of a control gap.

Here, a further development according to the invention, for which independent protection is warranted, provides that one control lip and one sealing lip are provided at both sides of the control body of a preferably generally star shaped or x-shaped lip shaped part. The lips are located on the opposite sides of the control body and are each allocated to a control gap with a downstream flow opening. Such a star shaped or x-shaped lip shaped part can for example be glued, welded or mounted in a similar manner to a downstream face of an annular housing wall, which is arranged approximately in the center inside the housing. This component can essentially be made from two components, namely the housing and the lip shaped part connected thereto.

In order to provide the lip shaped part in the insertion part with a solid and safe fastening, it is advantageous for the annular body of the lip shaped part to be fastened in a housing chamber between the upstream housing part and the downstream housing part. Here, a preferred embodiment of the invention provides for the housing chamber to be closed except for an annular gap and that the annular gap is penetrated by a connecting part of the lip shaped part, connecting its annular body with the control and/or sealing lips.

The small production expense for the insertion part according to the invention is reduced even further if the housing parts adjacent to the lip shaped part can be snapped together. For the same reason it is useful if the housing core, preferably cone-shaped or tapering in the flow direction, is connected to an upstream housing part via an at least radially extending connection bar in one piece.

Additional embodiments of the invention are described in the other subclaims. In the following, the invention and its essential features is explained in greater detail using the drawings.

DETAILED DESCRIPTION OF THE PREFERRED EMBODIMENTS

Figure 1:
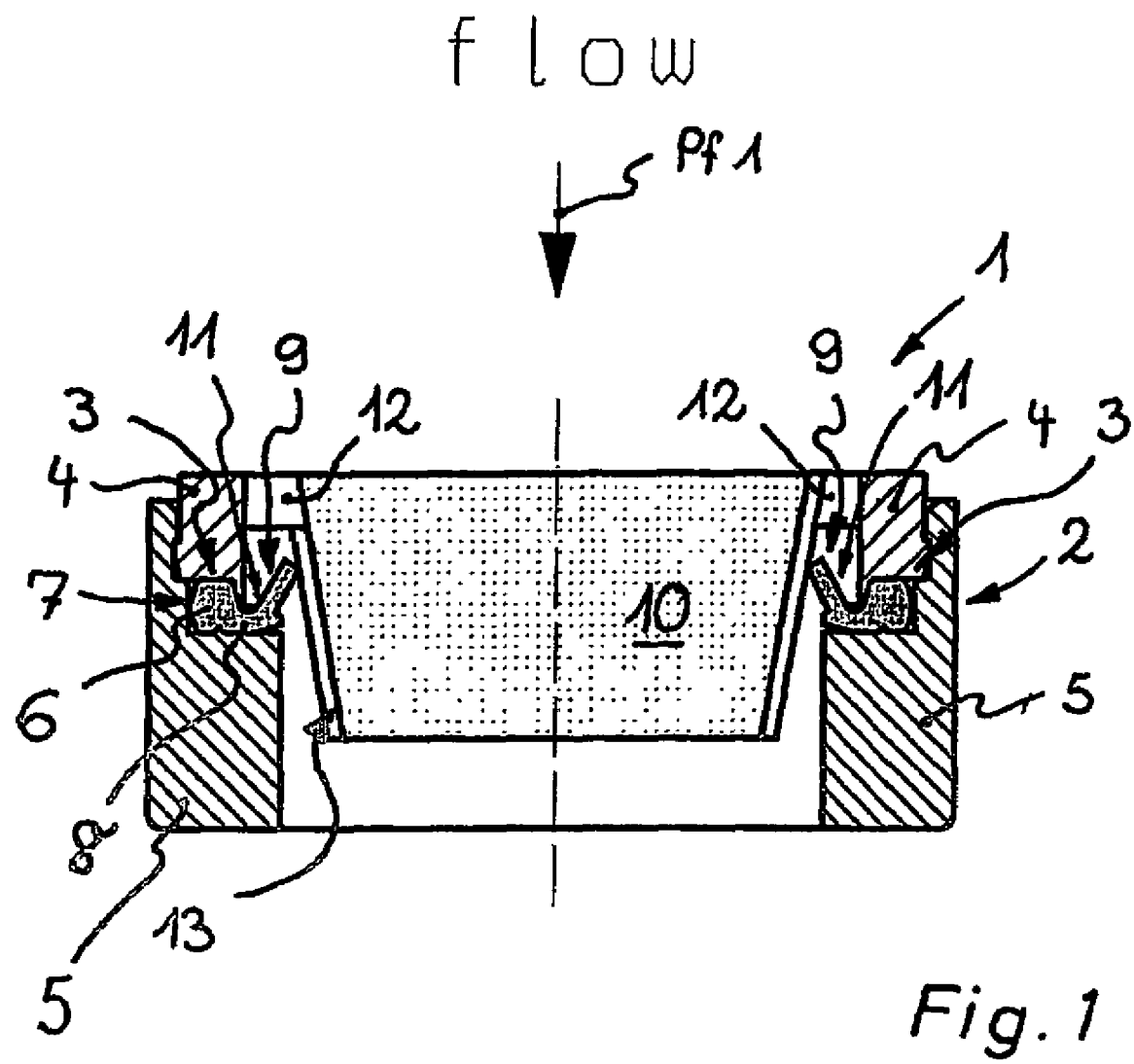
FIG. 1 an insertion part, in a longitudinal cross-section, embodied as a flow regulator, with its control lip cooperating with a cone shaped or tapered central housing core also located inside the housing, FIG. 2 an insertion part, also shown in a longitudinal cross-section similar to the embodiment of FIG. 1, which is embodied both as a flow regulator as well as a back-flow preventer and with its lip shaped part additionally comprising a downstream sealing lip, FIG. 3 a flow regulator comparable to the one in FIG. 1 shown during increased pressure conditions in longitudinal cross-sections (cf.
Figure 2:
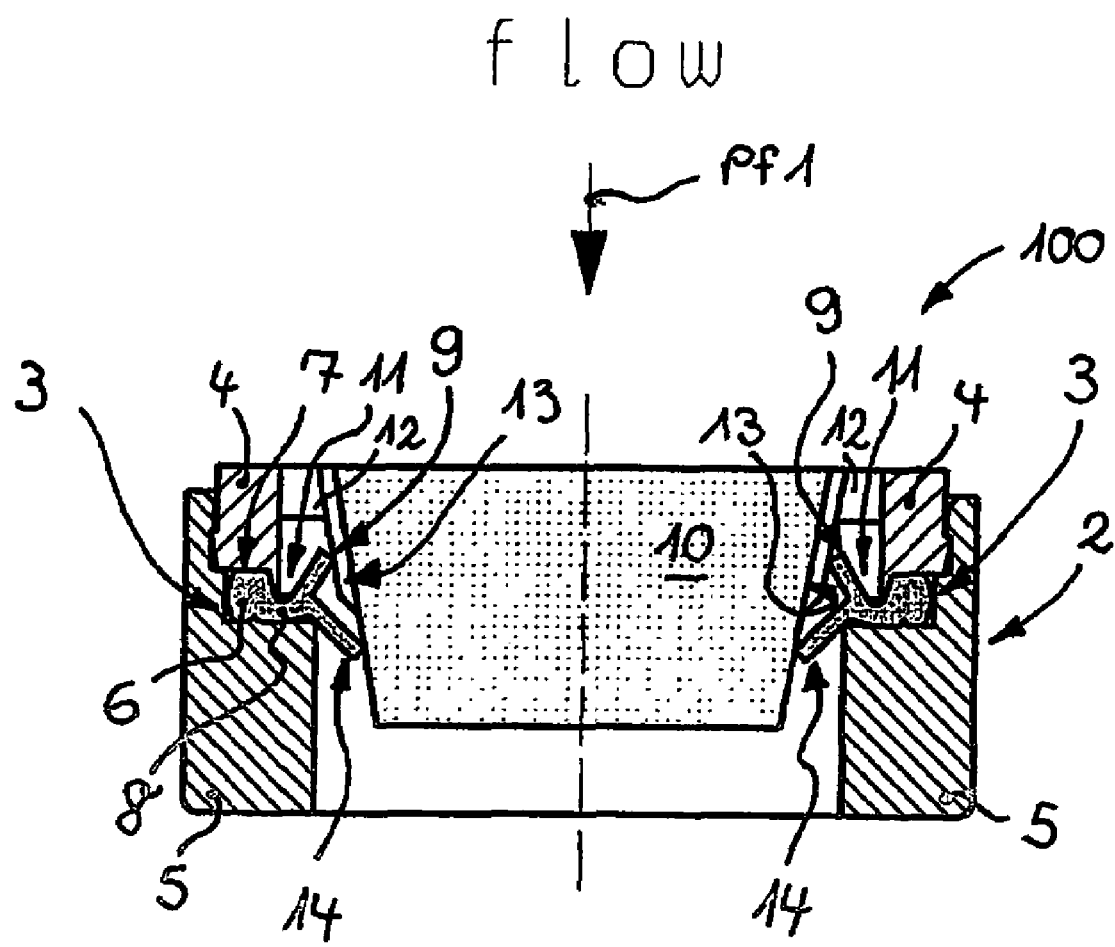

In the FIGS. 1 and 2 insertion parts 1, 100 are shown, which can be used at least as flow regulators in a gas or liquid line. The insertion parts 1, 100 are provided with a housing 2, with an annular lip shaped part 3 being held against an interior housing circumference.

As discernible from FIGS. 1 and 2, the housing 2 is provided in two parts, an upstream part and a downstream part 4, 5. The lip shaped part 3 is fastened with its annular body 6 in a housing chamber 7 between the upstream and the downstream housing parts 4, 5. This housing chamber 7 is formed in a closed fashion except for an annular gap. The annular gap is penetrated by a connecting part 8 of the lip shaped part 3, which connects the annular body 6 with an annular control lip 9.

The control lip 9 is embodied as a throttle body or control body, limiting a control gap between the control lip 9 and a central housing core 10, with the gap changing depending on pressure.

As shown in FIGS. 1 and 2, the control lip 9 is aligned with its free lip end region in an opposite direction to the flow direction Pf1 of the fluid, and delimits a blind hole-type annular space 11, that is open towards the upstream side. After reaching the predetermined pressure of the fluid flowing in through the line and thus also through the insertion part 1, 100, the control lip 9 is pressed, depending on pressure, in the direction of the housing core 10 such that the control gap narrows. By this pressure-dependent movement of the control lip 9 and the narrowing of the control gap resulting therefrom, the amount of fluid flowing per time unit remains generally constant even in strong pressure variations, with the flow amount remaining within a predetermined tolerance range.

The housing core 10 is provided tapered or cone-shaped and narrows evenly in the flow direction Pf1. The housing core 10, connected in one piece with the housing part 4 via a bar 12 aligned radially with respect to the flow direction, is provided at its exterior circumference, as discernible in the cross-sections shown in FIGS. 3b, 3d, and 3f, with moldings 13, shaped as an ellipsoid, polygonal, or arc-shaped, as shown, which form circumferentially open flow channels aligned in the flow direction. These moldings 13 are evenly distributed over the circumference of the housing core 10.

The insertion part 100 shown in FIG. 2 is additionally embodied as a back-flow preventer, as well. At the connection part 8 of the lip shaped part it is also provided with a sealing lip 14 arranged downstream of the control lip 9, that can be displaced by the fluid and is aligned with a free lip end region thereof extending in the flow direction Pf1. This sealing lip 14 is provided as sealing body, which seals in the closed position a flow opening limited between the housing core 10 and the interior circumference of the housing. In an undesired backflow of the fluid opposite to the flow direction Pf1, the sealing lip 14 is pressed in the direction of the housing core 10 such that it contacts with the free lip end region thereof the opposing housing surface in a sealing manner. For this purpose, the housing core 10 has a core region free from grooves or moldings that is impinged by the sealing lip 14.

Figure 3A:
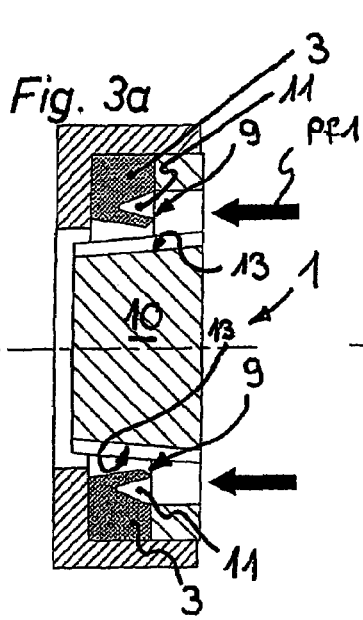
FIGS. 3a, 3c, 3e) and cross-sections (cf.
Figure 3C:
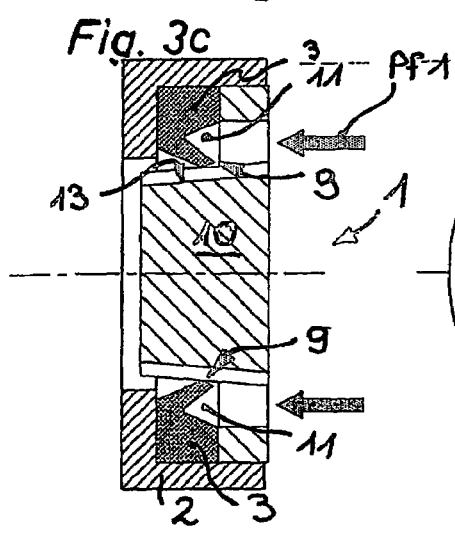
Figure 3E:
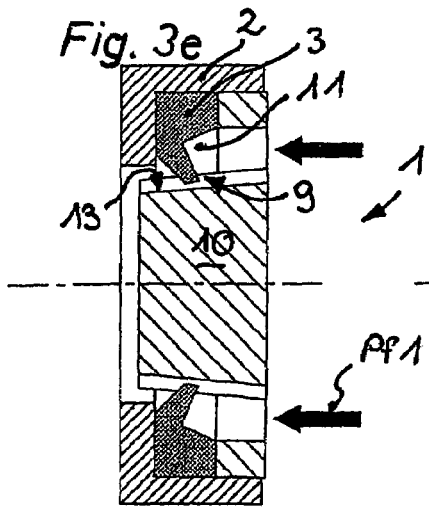
Figure 4A:
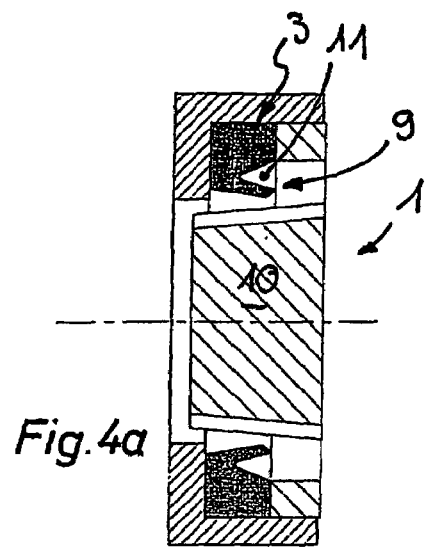
Figure 4B:
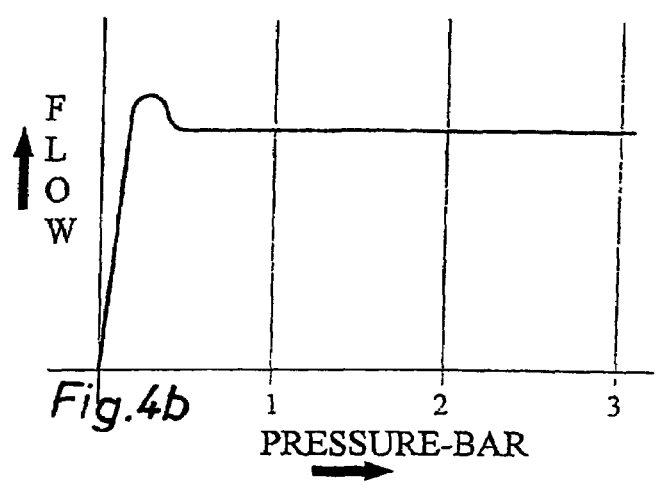
Figure 4C:
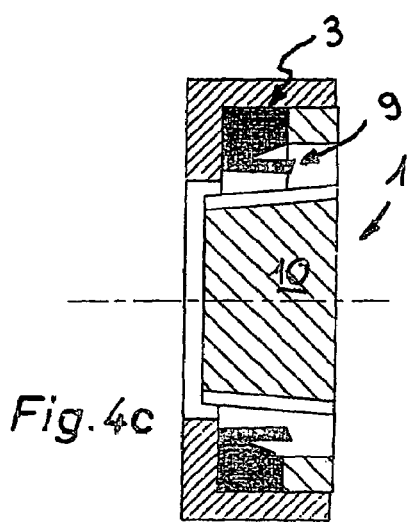
Figure 4D:
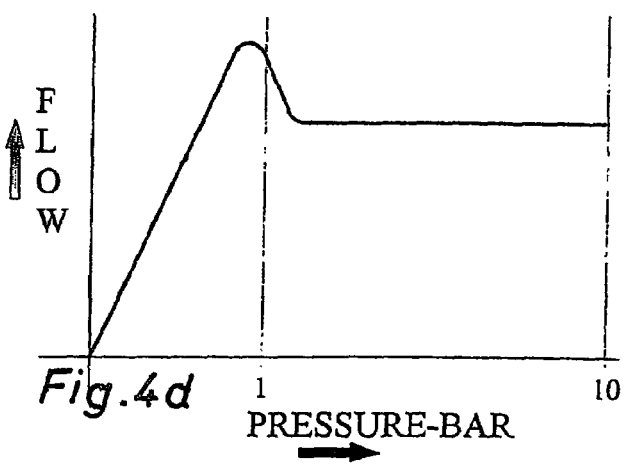
Figure 4E:
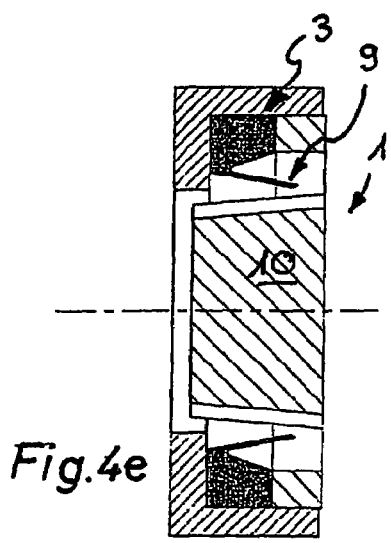
Figure 4F:
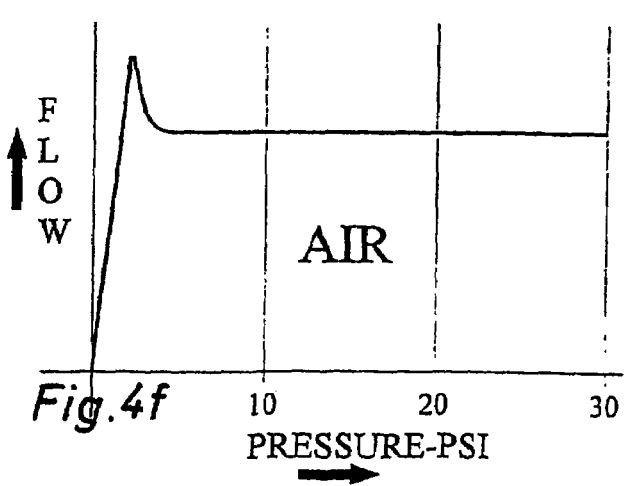

In FIGS. 4b, 4d, and 4f the amount of flow per time unit depending on the pressure of the fluid are shown for different embodiments of the lip shaped part. The corresponding insertion parts 1, embodied as flow regulators, with their various lip shaped parts 3 being shown in FIGS. 3a, 3c, and 3e in a cross-section. As discernible from a comparison of FIGS. 4a through 4f, the reaction pressure and the reaction response of the lips 9, 14, and particularly of the control lip 9, can be predetermined by the length, the thickness, or similar design features and dimensions of the lip 9, 14 and also by the shore-hardness and similar material characteristics of the lip shaped part 3.

A particular advantage of the flow regulator 1, 100 shown here is that its reaction behavior is less dependent on the material characteristics of the rubber-elastic throttle body or control body 9 but rather on its design and dimensions.

Figure 3B:
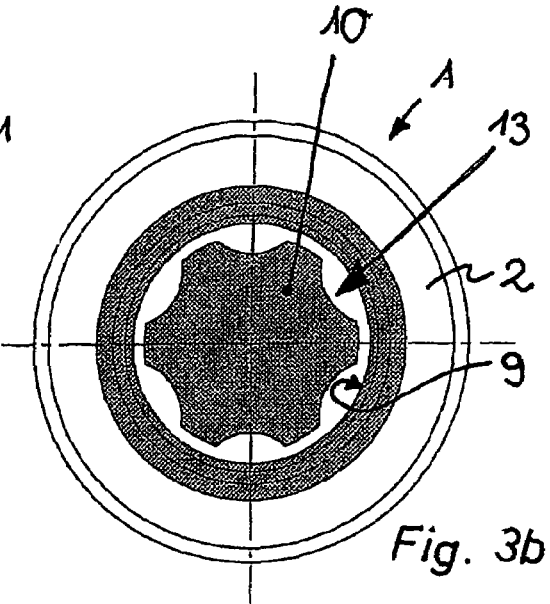
FIGS. 3b, 3d, 3f), and FIG. 4 various embodiments of the insertion part, adapted to the desired reaction behavior, and the performance diagrams allocated to the illustrated embodiments.
Figure 3D:
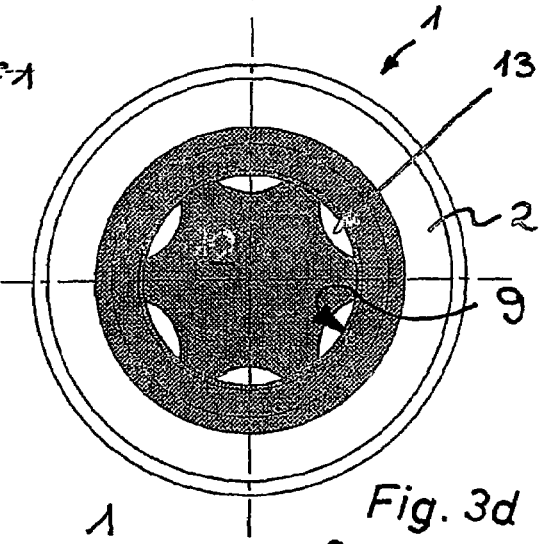

As shown in FIGS. 3a, and 3b, the control lip 9 hardly changes under light pressure. In FIGS. 3c and 3d it is discernible that the control lip 9 quickly reacts to slightly rising water pressure and is pressed in the direction towards the housing core 10. This pressure-dependant motion of the control lip 9 is discernible as a distinct peak in the curve progression in FIGS. 4b, 4d, and 4f. This peak, which is more or less discernible depending on the design of the control lip 9, can be used as a controlling impulse, in order to start a flow heater, for example.

Figure 3F:
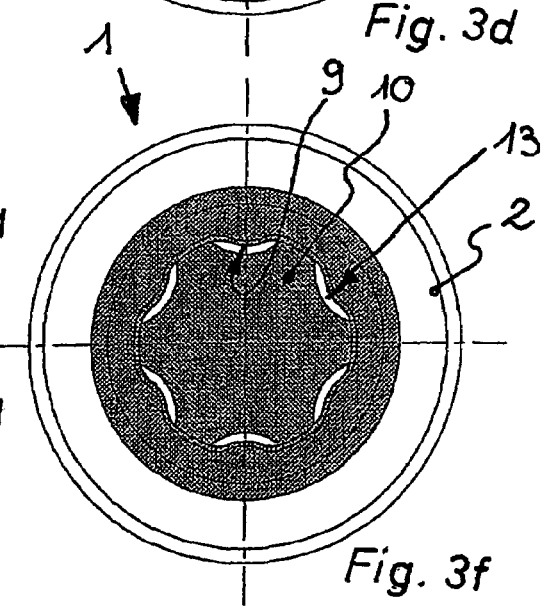

In FIGS. 3e and 3f it is discernible that the control lip 9 is also pressed into the moldings 13 in the housing core during increasing water pressure, with a maximum flow amount per time unit not being exceeded.

The control lip 9 of the insertion part 1 shown in FIG. 4a is predetermined for a low pressure range between 0.2 and 3.0 bar and amounts of liquids between 1 to 8 l/min. For this purpose, the free lip end region is designed thin and arranged in proximity to the housing core 10 even in the resting position.

The control lip 9 of the insertion part 1 shown in FIGS. 4c and 4d is designed for high pressure values from 1 to 10 bar and for flow amounts of 1 to 2 l/min. For this purpose, the free lip end region is designed relatively thick and positioned farther apart from the housing core. Therefore, a higher pressure is required for pressing this control lip 9 into the moldings 13 of the housing core 10.

In FIG. 4e an insertion part 1 is shown, which has a very thin and comparatively long control lip 9, reaching with its free lip end region to the proximity of the housing core 10. The insertion part 1 according to FIG. 4e is designed for fluids with low viscosity and/or fluids with little density, such as for example air or other gases, and for low pressure and high flow amounts per time unit of approximately 80 l/min. This insertion part can also be used for such applications, in which conventional flow regulators with an O-ring shaped throttle body or control body cannot be used. Here, in contrast to conventional flow regulators, the reaction pressure and the reaction behavior can be varied in both areas by an appropriate selection of geometry and material of the lip shaped part 3 and its control lip 9. The reaction pressure of such insertion parts can be designed such, using appropriate geometrical designs by its control lip 9, that the reaction pressure is as low as 0.2 bar, for example.

The insertion parts 1, 100 shown here can be used for multiple purposes and they are characterized by a simple production and a consistent and secure function.

The invention claimed is:

1. An insertion part which can be used in a gas line or a liquid line, the insertion part comprising a housing (2), and a displaceable sealing body arranged in an interior of the housing which can seal a flow opening of a feeder channel in a closed position, the insertion part (100) is provided with an annular lip shaped part (3), having at least one upstream control lip (9) and an annular body (6) held inside the housing, and which in an area of at least one flow opening has at least one sealing lip (14), downstream from the control lip (9), as the sealing body that can be displaced by the fluid, with a free lip end region that contacts an opposing housing surface in a sealing manner in the closed position, wherein the at least one control lip (9) is aligned with the free lip end region extending in an opposite direction to a flow direction (Pf1) of the fluid and limits an annular upstream opening space (11) between the control lip and the interior circumference of the housing.

2. An insertion part (100) which can be used in a gas line or a liquid line, the insertion part comprising a housing (2), and a displaceable sealing body arranged in an interior of the housing which can seal a flow opening of a feeder channel in a closed position, the insertion part (100) is provided with an annular lip shaped part (3) having an annular body (6) held inside the housing, and which in an area of at least one flow opening has at least one sealing lip (14) as the sealing body that can be displaced by the fluid, with a free lip end region that contacts an opposing housing surface in a sealing manner in the closed position, wherein the at least one sealing lip (14) is provided at the annular body (6) one side of the lip shaped part (3) and a control lip (14) is arranged on an other side of the annular body (6), and the sealing and control lips (14, 9) are arranged in an area of an allocated flow opening and in an area of a control gap, respectively.

3. An insertion part according to claim 2, wherein one control lip (9) and one sealing lip (14) are each provided on opposite sides of the annular body (6) of a generally star shaped or x-shaped lip shaped part (3) and the lips (9, 14), provided on the opposite sides of the annular body (6), are each allocated to a control gap having at least one downstream flow opening.

* * * * *